(12) United States Patent
Swanek

(10) Patent No.: US 7,475,586 B2
(45) Date of Patent: Jan. 13, 2009

(54) FLOW METER CALIBRATION APPARATUS AND METHOD

(75) Inventor: Dennis Jerome Swanek, Weston (CA)

(73) Assignee: Total Meter Services Inc., Vaughan (CA)

( * ) Notice: Subject to any disclaimer, the term of this patent is extended or adjusted under 35 U.S.C. 154(b) by 403 days.

(21) Appl. No.: 11/399,615

(22) Filed: Apr. 7, 2006

(65) Prior Publication Data

US 2007/0234778 A1   Oct. 11, 2007

(51) Int. Cl.
*G01F 25/00* (2006.01)
(52) U.S. Cl. .......................... 73/1.22; 73/1.17; 73/1.19
(58) Field of Classification Search ................. 73/1.22, 73/1.19, 1.17
See application file for complete search history.

(56) References Cited

U.S. PATENT DOCUMENTS

| | | | |
|---|---|---|---|
| 2,017,267 A * | 10/1935 | Weymouth .................... | 73/239 |
| 2,772,561 A | 12/1956 | Plank et al. | |
| 3,021,703 A | 2/1962 | Pfrehm | |
| 3,028,744 A | 4/1962 | Bagwell et al. | |
| 3,120,118 A | 2/1964 | Boyle | |
| 3,177,699 A | 4/1965 | Lindquist et al. | |
| 3,273,375 A | 9/1966 | Howe | |
| RE32,157 E | 5/1986 | Waugh et al. | |
| 4,628,724 A * | 12/1986 | Maurer ....................... | 73/1.17 |
| 4,649,734 A | 3/1987 | Hillburn | |
| 5,072,416 A | 12/1991 | Francisco, Jr. et al. | |
| 5,349,846 A | 9/1994 | Martinez et al. | |
| 5,421,188 A | 6/1995 | Sager | |
| 5,798,466 A | 8/1998 | Sataka et al. | |
| 5,965,800 A | 10/1999 | Brown | |
| 6,629,447 B1 | 10/2003 | Collins | |
| 6,721,674 B2 | 4/2004 | Borzsonyi | |
| 7,395,708 B2 * | 7/2008 | Kirchner et al. ............... | 73/239 |

* cited by examiner

*Primary Examiner*—Thomas P Noland
(74) *Attorney, Agent, or Firm*—Bereskin & Parr

(57) ABSTRACT

A meter calibration apparatus includes a fluid intake conduit, a fluid discharge conduit, and a calibration cylinder connected in fluid communication with the intake and discharge conduits, the calibration cylinder defining a chamber. The apparatus further includes a piston slidable within the cylinder and defining first and second chamber portions on opposite sides of the piston, and at least one valve having an intake port in fluid communication with the intake conduit, a first flow port with a first flow conduit extending therefrom and connected to the first chamber portion for providing fluid communication therebetween, and a second flow port with a second flow conduit extending therefrom and connected to the second chamber portion for providing fluid communication therebetween. The valve is adjustable to selectively direct flow along one of two chamber filling flow paths, the first chamber filling flow path extending from the intake conduit, through the first flow conduit, and terminating in the first chamber portion; the second chamber filling flow path extending from the intake conduit, through the second flow conduit, and terminating in the second chamber portion; the first and second chamber filling flow paths being in fluid isolation from the discharge conduit.

20 Claims, 9 Drawing Sheets

FLOW METER CALIBRATION APPARATUS AND METHOD

FIELD

This present invention relates to methods and apparatuses for calibrating flow meters.

BACKGROUND

U.S. Pat. No. 2,772,561 discloses an apparatus for calibrating an indicating flowmeter in a pipeline. The apparatus includes plug means insertable in the pipeline to form a movable seal within the pipeline, the plug means being adapted to be propelled through the pipeline by the flowing fluid at the velocity thereof. the apparatus includes first and second signal means mounted in longitudinally spaced relationship at predetermined points in the pipeline, the signal means being adapted to be actuated by the arrival of the plug means thereat. The apparatus includes electrical circuit means connecting the first and second signal means with the flowmeter, whereby the indicating flowmeter is energized by the arrival of the plug means at the first signal means and de-energized by the arrival of the plug means at the second signal means.

U.S. Pat. No. 3,021,703 discloses an apparatus for calibrating a meter such as a positive displacement meter in a pipe line, the apparatus comprising a calibration barrel adapted to be fluidly connected into the pipe line. A pulse generator is operatively connected to the meter and on flow of fluid through the meter, pulses are generated. Electronic switching means are electrically connected to the pulse generator and an electronic counter means is electrically connected to the electric switching means. Adjacent each end of the barrel and operatively connected thereto are flow indicating means which are adapted to be actuated by flow of fluid from the pipe line through the calibration barrel whereby pulses from the pulse generator are led into the electronic counter means by sequential actuation of the flow indicating means by flow of fluid from the pipe line through the calibration barrel.

U.S. Pat. No. 3,273,375 discloses a calibrating barrel comprising an outer tubular housing closed at each end, a reduced diameter and length inner tubular barrel supported within the housing providing an annulus between the exterior of the barrel and the interior of the housing, and a wall partitioning the annulus into two longitudinal portions. The housing has fluid ports therein communicating with each annulus portion wherein fluid flowing into one port flows within one annulus portion through the barrel, through the other annulus portion and out of the other port. A free piston is disposed in the barrel and first and second spaced apart detector switches are actuated by the passage of the piston as it moves in the barrel.

SUMMARY

The following summary is intended to introduce the reader to this specification but not to define any invention. In general, this specification discusses one or more methods or apparatuses for calibrating a flow meter. Aspects of the teaching disclosed herein can serve as a Primary Reference Standard for calibrating various types of adjustable Liquid Flow Metering devices with low to medium volume flow capacities, for field or shop applications. Low to medium flow rates can refer to, for example, flow rates of about 1 to 90 L/min.

One or more of the methods and apparatuses disclosed herein can provide advantages over methods and apparatuses associated with open type Volumetric Can Provers that can be used for calibrating flow meters with low to medium flow rates. Volumetric Can Provers can require that an operator manually fill an open-top calibrated vessel having a graduated scale thereon to indicate volume. A predetermined registered amount of fluid is generally dispensed into the vessel, at various flow rates (High/Low), with the meter to be calibrated indicating the total volume dispensed. Once the pre-set amount of fluid has been dispensed, the fluid in the vessel is left to settle to allow for any air entrained in the fluid to be released into the atmosphere, after which the actual volume can be read from the graduated scales for comparison to the volume indicated by the dispensing meter. The vessel can be emptied by manually dumping the dispensed fluid either into a temporary holding tank or directly back to the customers storage tank. In many cases this procedure is repeated several times to complete a calibration sequence for the flow meter.

According to one aspect of the present teaching, a novel meter calibration apparatus is provided, the apparatus including a fluid intake conduit, a fluid discharge conduit, and a calibration cylinder connected in fluid communication with the intake and discharge conduits, the calibration cylinder defining a chamber. The apparatus further includes a piston slidable within the cylinder and defining first and second chamber portions on opposite sides of the piston, and at least one valve having an intake port in fluid communication with the intake conduit, a first flow port with a first flow conduit extending therefrom and connected to the first chamber portion for providing fluid communication therebetween, and a second flow port with a second flow conduit extending therefrom and connected to the second chamber portion for providing fluid communication therebetween. The valve is adjustable to selectively direct flow along one of two chamber filling flow paths, the first chamber filling flow path extending from the intake conduit, through the first flow conduit, and terminating in the first chamber portion; the second chamber filling flow path extending from the intake conduit, through the second flow conduit, and terminating in the second chamber portion; the first and second chamber filling flow paths being in fluid isolation from the discharge conduit.

In some embodiments, the first valve position can define a first evacuation flow path extending from the second chamber portion to the discharge conduit, and the second valve position can define a second evacuation flow path extending from the first chamber portion to the discharge conduit. The at least one valve can comprise an outlet port in fluid communication with the discharge conduit. The first evacuation flow path can comprise the second flow port and the outlet port, and the second evacuation flow path can comprise the first flow port and the outlet port.

In some embodiments, the valve can comprise a shut-off position between the first and second valve positions wherein the intake port is in fluid isolation from the first and second flow ports and the outlet port. The valve can comprise a housing defining an internal pocket and a flow control member rotatably retained in the pocket, the first and second flow ports extending from the housing on opposing sides of the pocket, the intake port extending from the housing intermediate the first and second flow ports, the valve including an outlet port extending from the housing opposite the intake port. The flow control member can comprise a central body with two separate channels extending therethrough, each channel extending between first and second channel openings provided in an outer surface of the body and spaced apart at 90 degrees therearound, the control member including o-ring channel seals retained in the body about the channel openings for engaging an inner surface of the pocket. The inlet, outlet, and first and second flow ports can include support elements at inner ends thereof, the support elements presenting a concave endface in alignment with the inner surface of the pocket for supporting the o-ring channel seals when the control member is rotated, and the support elements including flow apertures therethrough to provide fluid communication across the support elements, the flow apertures being sized to minimize turbulence of fluid flow passing through the flow apertures.

According to another aspect of the present teaching, a novel flow meter calibration apparatus is provided wherein the apparatus comprises (a) a calibration cylinder defining a chamber, the cylinder including first and second end caps at axially opposing ends thereof, a first cylinder port adjacent the first end cap and a second cylinder port adjacent the second end cap; (b) a piston movable within the cylinder between a first stop position adjacent the first end cap and a second stop position adjacent the second end cap, the piston defining a first and a second chamber portion on opposite sides of the piston, the first and second chamber portions being in fluid communication with the first and second cylinder ports, respectively, regardless of the position of the piston; and (c) a valve movable between first and second valve positions for alternately directing fluid flow from a supply line to one and separately to the other of the first and second cylinder ports; and wherein the volume swept by the piston when moving from one to the other of the first and second stop positions defines a calibration volume, and upon admitting an amount of fluid through a respective cylinder port equal to the calibration volume, further fluid flow into the respective cylinder port is stopped.

In some embodiments, the apparatus can include a piston position indicating mechanism for providing visual indication that the piston is precisely positioned in a respective one of the first and second stop positions. The piston position indicating mechanism can include a triggering element fixed to the piston and a sensing element responsive to the triggering element and fixed relative to the cylinder. The triggering element can comprise a piston magnet fixed to the piston, and the sensing element comprises a needle secured to a needle rotor assembly, the needle rotor assembly including a rotor magnet for responding to a magnetic field generated by the piston magnet.

In some embodiments, the apparatus can comprise a first conduit extending from the valve to the first cylinder port, and a second conduit extending from the valve to the second cylinder port. A flow direction indicating mechanism can be mounted in at least one of the first and second conduits for providing visual confirmation of the direction of travel of the piston when moving between the first and second stop positions. The flow direction indicating mechanism can comprise a sealed hollow casing having opposed flow apertures for inline connection along a respective one of the first and second conduits, and a flow direction pointer pivotably mounted in the casing between the opposed flow apertures.

According to another aspect of the present teaching a valve is disclosed comprising (a) a housing defining an internal pocket and a flow control member rotatably retained in the pocket; (b) four ports extending from the housing, the ports including a first and a second flow ports extending from the housing on opposing sides of the pocket, an intake port extending from the housing intermediate the first and second flow ports, and an outlet port extending form the housing opposite the intake port; (c) a flow control member having a central body rotatably retained in the pocket of the housing, the body having two separate channels extending therethrough, each channel extending between first and second channel openings provided in an outer surface of the body and spaced apart at 90 degrees therearound, the control member including o-ring channel seals retained in the body about the channel openings for engaging an inner surface of the pocket; and (d) support elements fixed within each of the ports at inner ends thereof, the support elements presenting a concave endface in alignment with the inner surface of the pocket for supporting the o-ring channel seals when the control member is rotated.

In some embodiments, the support elements include flow apertures therethrough to provide fluid communication across the support elements, the flow apertures being sized to minimize turbulence of fluid flow passing through the flow apertures. In some embodiments, the valve comprises a leak detection structure for detecting leakage of the channel seals, the leak detection structure including a valve containment reservoir disposed between the inner surface of the pocket and the outer surface of the body of the control member, and a leak drain providing fluid communication between the containment reservoir and a bleed valve mounted to the exterior of the housing.

According to another aspect of the present teaching, a method for calibrating a fluid flow meter is provided. The method can include the steps of dispensing fluid from a source metered by a flow meter along a first filling flow path to a first side of a piston in a cylinder to move the piston from a first stop position to a second stop position, at which point further fluid flow into the first side of the cylinder is stopped, the swept volume of the piston providing a precisely known first volume for comparison against the volume of dispensed fluid indicated by the flow meter. The method can include redirecting the fluid to the second side of the piston along a second filling flow path, and opening an evacuation flow path for evacuating fluid from the first side of the cylinder, the dispensing fluid forcing the piston from the second stop position to the first stop position, which provides a precisely known swept second volume for comparison against the dispensed volume indicated by the flow meter. The first and second precisely known volumes can be equal to each other.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION OF THE INVENTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Figure 1:
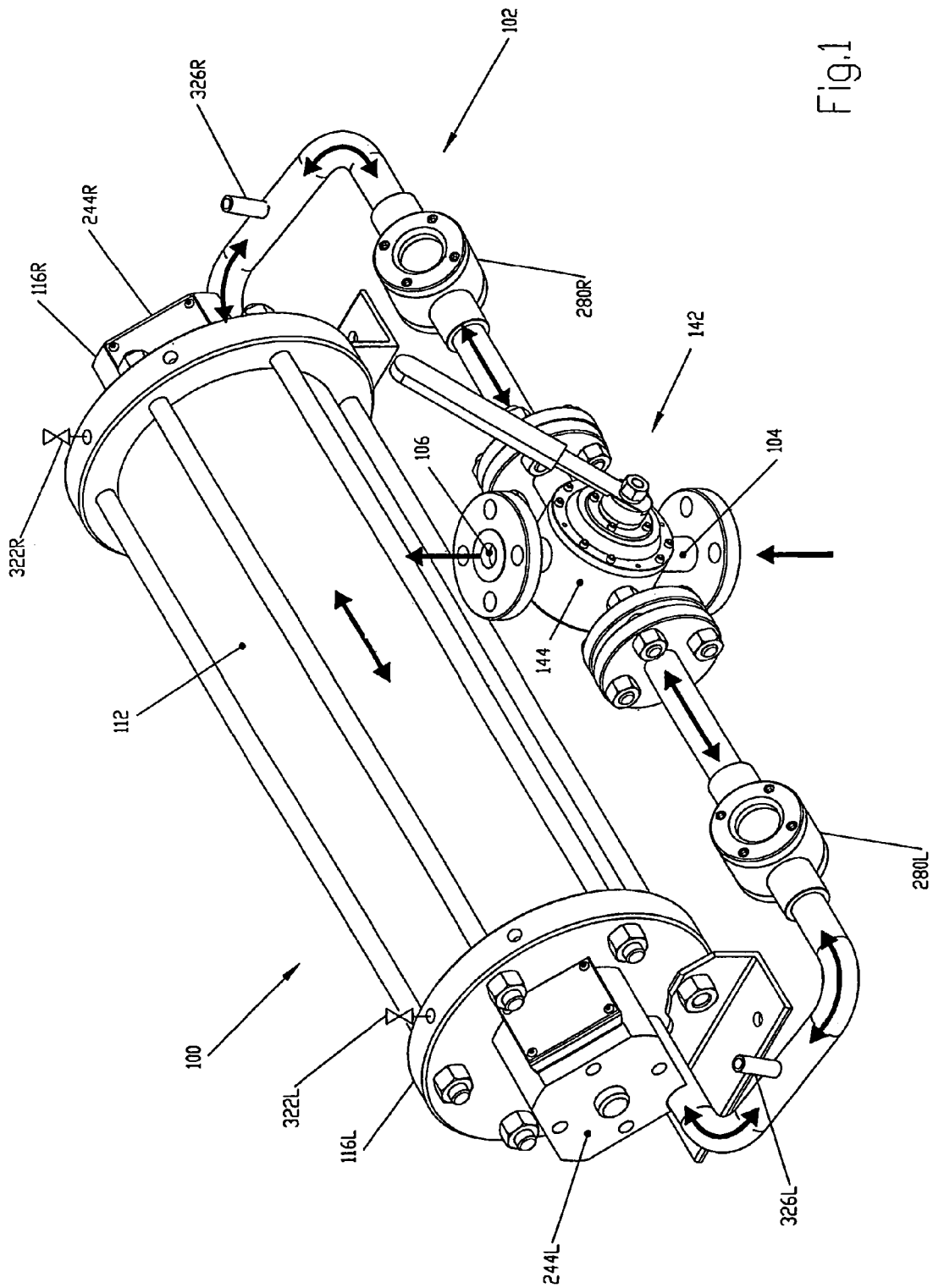
FIG. 1 is a perspective view of a meter calibration apparatus.

A flow meter calibration apparatus 100 is shown generally in FIG. 1. The apparatus 100 comprises a fluid circuit 102 having an intake conduit 104, at least one discharge conduit 106, and a calibration cylinder 112 in fluid communication with the intake 104 and the at least one outlet 106. The intake conduit 104 is adapted to receive a fluid dispensed at a flow rate measured by a meter to be calibrated. The calibration cylinder 112 is connected downstream of the intake conduit 104, and upstream of the outlet 106. During a calibration cycle, fluid is directed from the intake conduit 104 to the cylinder 112, and from the cylinder 112 to the outlet 106.

Figure 2:
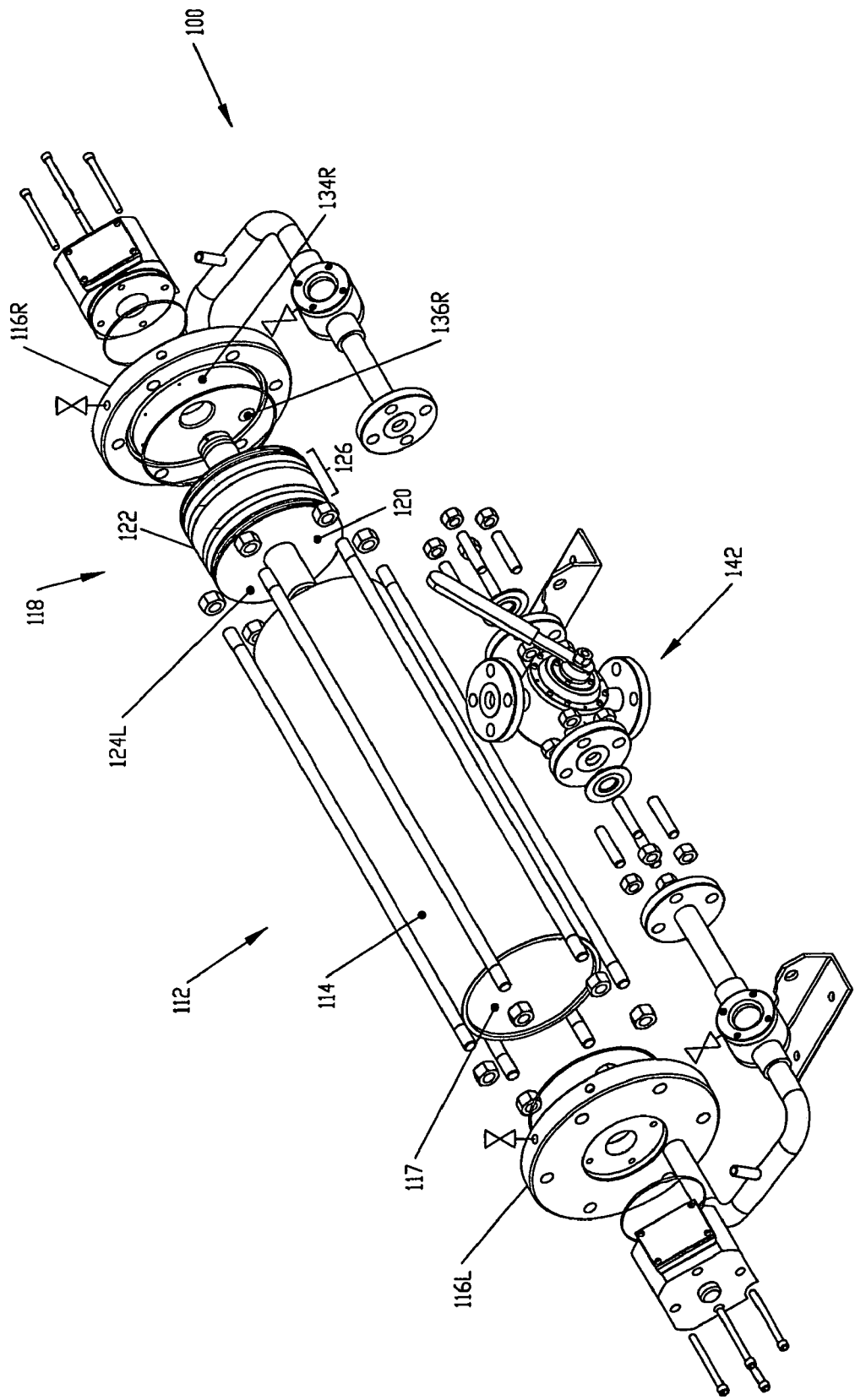
FIG. 2 an exploded perspective view of the apparatus of FIG. 1.
Figures 3, 4:
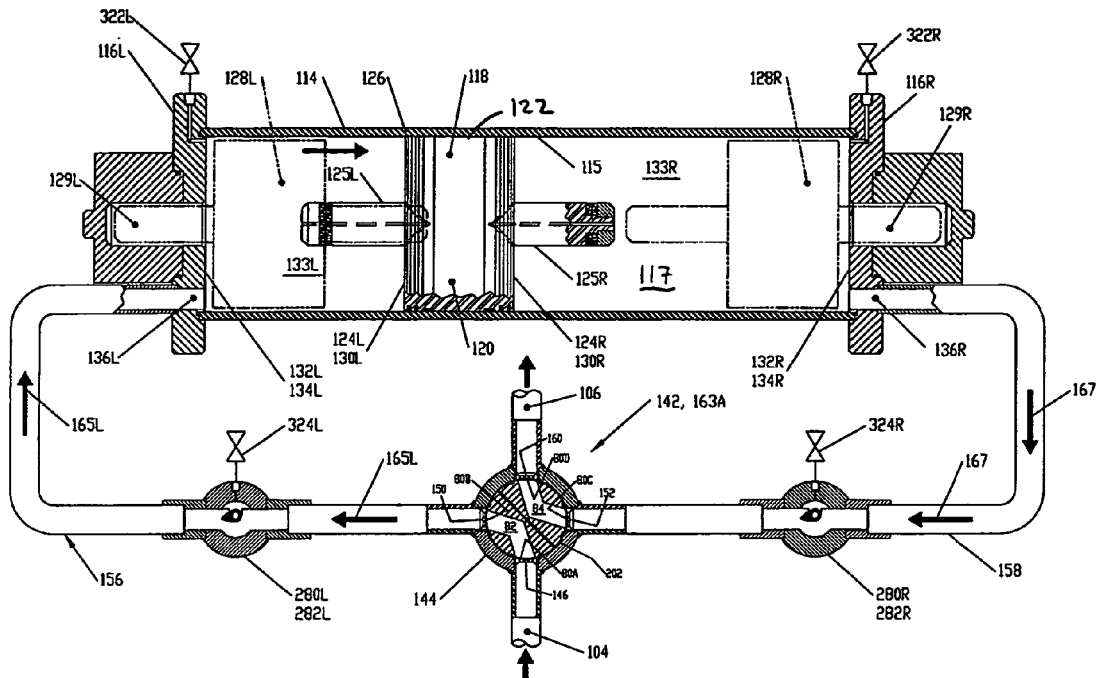
FIGS. 3 and 4 are schematic views of the apparatus of FIG. 1 showing a cylinder member in cross-section and a valve member in first and second positions, respectively.

Referring now also to FIGS. 2, 3 and 4, the cylinder 112 includes a tubular shell 114 extending between first and second end caps 116L and 116R, respectively. In this document, reference character suffixes "L" and "R" generally refer to first and second ones of like or mirror-image elements sharing common features, and generally positioned adjacent left and right sides of the apparatus 100, respectively. Use of such reference characters without the suffix refers generically to the respective element. The inner surface of the tubular shell 114 and opposed, inwardly directed faces of the end caps 116L and 116R define a cylinder chamber 117.

The shell 114 is, in the example illustrated, a precision machined tube made from ASTM A513 D.O.M. (Drawn-Over-Mandrel) seamless mechanical grade tubing. The shell 114 can be precision machined and honed to create an ultra fine surface finish for the inner surface 115 of the shell. The first and second ends of the shell 114 can be machined square with a lead-in taper to facilitate insertion of a piston 118.

The internal surface 115 of the shell 114, as well as the external surface opposite the internal surface 115, can be plated with a base coat of electroless nickel, which can improve wear and corrosion resistance of the surfaces. The internal surface 115 is, in the example illustrated, provided with a topcoat layer comprising a composite of electroless nickel and ceramic. The topcoat layer can significantly reduce the coefficient of friction between the piston seal package 126 and the inner surface 115 of the shell 114. In the example illustrated, it has been estimated that about a 60% reduction in friction was achieved by providing the topcoat layer. This reduction in friction can facilitate satisfactory motion of the piston 118 within the cylinder 112 at relatively low fluid pressure levels within the cylinder 112.

The piston 118 is slidably disposed in the cylinder 112. In the example illustrated, the piston 118 includes a piston body 120 that is generally cylindrical in shape, having a piston sidewall 122 extending between opposed first and second piston faces 124L, 124R (see also FIG. 9). In the example illustrated, the piston body 120 is in the form of a solid machined aluminum cylindrical component with a precise diameter. The surfaces of the piston 118 can be hard anodized to reduce or eliminate any corrosion of the aluminum surfaces and to increase the hardness thereof, which can reduce operational wear.

The piston 118 is, in the example illustrated, provided with respective first and second stub shafts 125L, 125R extending axially outwardly from the respective piston faces 124L, 124R. The end caps 116L, 116R are provided with respective shaft recesses 129L, 129R for receiving the stub shafts 125L, 125R when the piston is in respective first and second piston stop positions 128L, 128R.

The piston sidewall 122 is generally cylindrical, and of smaller outer diameter than the inner diameter of the tubular shell 114 of the cylinder 112. The piston 118 is provided with a piston seal package 126 (see also FIG. 9) fixed to the piston body 120 and adapted to bear against the inner surface of the tubular shell 114 to provide a leak-proof seal between the piston 118 and the cylinder 112.

In the example illustrated, the seal package 126 includes dual piston ring seals 126A retained in respective spaced apart piston seal grooves 126B. The seal package 126 further includes, in the example illustrated, two wear rings 126C retained in respective grooves 126D adjacent the ring seals 126A. The wear rings 126C can reduce or eliminate any rocking or wobbling of the piston 118 as it travels in the cylinder 112. The mass and configuration of the piston are, in the example illustrated, specifically tailored to provide satisfactory linear velocity of the piston 118 at lowest possible operating pressures of the fluid.

The piston 118 is, in the example illustrated, adapted to slide or translate between a first stop position 128L adjacent the first end cap 116L, and a second stop position 128R adjacent the second end cap 116R. The first and second stop positions 128L, 128R are defined by engagement of respective first and second piston stop surfaces 130L, 130R fixed to the piston 118, with respective first and second cylinder abutment surfaces 132L, 132R fixed to the cylinder 112.

In the example illustrated, the first and second piston stop surfaces 130L, 130R comprise at least portions of the respective first and second piston faces 124L, 124R of the piston 118. The first and second cylinder abutment surfaces 132L, 132R are defined by at least portions of respective inwardly directed first and second inner end cap faces 134L, 134R of the respective end caps 116L, 116R.

The piston 118 generally separates the chamber 117 of the cylinder 112 to define first and second chamber portions 133L, 133R thereof on respective sides of the piston 118. More particularly, the facing surfaces of the tubular shell 114 of the cylinder 112, the first piston face 124L, and the first inner end cap face 134L define a generally enclosed first chamber portion 133L, and the facing surfaces of the tubular shell 114, the second piston face 124R, and the second inner end cap face 134R define a generally enclosed second chamber portion 133R. The chamber portions 133L, 133R are described as "generally enclosed", because they are each adapted to have a maximum volume or fluid capacity that gets filled during a calibration cycle by fluid received in the intake 104. Upon becoming filled, no further fluid can be received in the respective chamber portion, and further flow into the intake is stopped. This operation will be explained in greater detail subsequently herein.

The cylinder 112 includes at least one cylinder port 136 adjacent each end cap 116L, 116R, for providing fluid communication between the cylinder 112 and the intake conduit 104 and outlet 106. In the example illustrated, the cylinder 112 is provided with a first and a second cylinder port 136L and 136R to provide fluid communication with the interior of the cylinder 112, on either side of the piston 118 (i.e. on sides adjacent the first and second piston faces 124L, 124R, respectively). The cylinder ports 136L, 136R are, in the example illustrated, spaced apart from each other by a longitudinal distance (i.e. parallel to the axis of the cylinder 112) that is greater than the sum of the stroke length of the piston 118 and the longitudinal extent of the piston body 120 (spacing between the first and second piston faces 124L, 124R). The first and second cylinder ports 136L, 136R are thus in fluid communication with the first and second chamber portions 133L, 133R, regardless of the position of the piston 118 in the cylinder 112.

The respective volumes or fluid capacities of the first and second chamber portions 133L, 133R are a function of the axial (i.e. longitudinal) distance between the piston 118 and the respective end caps 116L, 116R, and thus the chamber volumes vary with varying positions of the piston 118 in the cylinder 112. The chamber portions 133L, 133R do have fixed maximum and minimum values. When the piston 118 is in the first stop position 128L, the first chamber portion 133L is at its smallest (minimum) volume, and the second chamber portion 133R is at its greatest (maximum) volume. The chamber portions 133L, 133R at maximum and minimum volumes are reversed when the piston 118 is at the second stop position 128R.

The swept volume of the piston 118 when making a single pass from one to the other of the first and second stop positions 128L, 128R defines a single pass calibration volume. Thus, the single pass calibration volume is the product of the bore (i.e. inner diameter) of the cylinder 112 and the stroke length (i.e. axial travel or translation) of the piston 118 when moving from one to the other of the first and second stop positions 128L, 128R. In the example illustrated, the cylinder 112 is of a "rodless" configuration, and the piston 118 is "free floating" which refer to the fact that the piston 118 is completely contained within the cylinder 112, free of any rod that protrudes from the cylinder 112 and is attached to the piston 118. This construction can simplify the calibration procedure by providing a single, equivalent single pass calibration volume regardless of the direction of piston travel (i.e. regardless of which chamber is being filled and which is being evacuated of fluid). In the example illustrated, the single pass calibration volume is equal to the difference between the maximum and minimum volumes of each of the first and second chamber portions 133L, 133R.

The single pass calibration volume provides a preset, accurately known volume that is a function of the construction of the cylinder 112, and that is adapted to be used as a comparison against a meter measuring the volume of fluid dispensed to the cylinder 112.

The fluid circuit 102 of the apparatus 100 further includes at least one valve 142 for directing fluid flow into and out of the chamber portions 138L, 138R. In a preferred embodiment, as illustrated, a single valve 142 is provided. Having a single valve can simplify use of the apparatus 100, and can improve performance and accuracy thereof, but many benefits of the teaching disclosed herein can nevertheless be realized in configurations of the apparatus having more than one valve.

Figure 6:
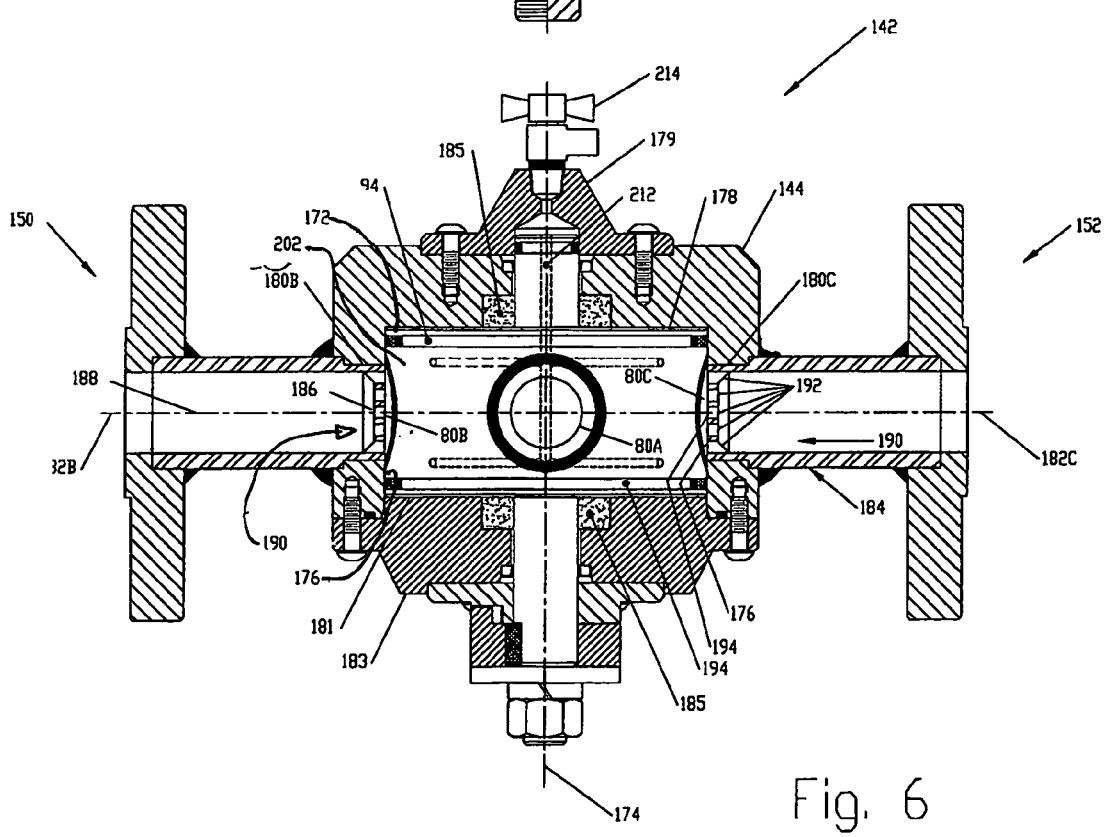
FIG. 6 is a side view in cross-section of a valve member of the apparatus of FIG. 1.

Referring now also to FIGS. 3, 4 and 6, the valve 142 has a housing 144 with an intake port 146 in fluid communication with the intake conduit 104, and a first flow port 150 and a second flow port 152 for providing selective fluid communication with the first and second chamber portions 133L, 133R, respectively, of the cylinder 112. In the example illustrated, a first flow conduit 156 extends between the first flow port 150 of the valve 142 and the first cylinder port 136L of the cylinder 112. A second flow conduit 158 extends between the second flow port 152 of the valve 142 and the second cylinder port 136R of the cylinder 112. The valve 142, in the example illustrated, further includes an outlet port 160 in fluid communication with the discharge conduit 106.

The valve 142 has a flow control member 162 disposed in the housing 144, between the valve ports 146, 150, 152, and 160. The flow control member 162 is movable between at least a first valve position 163A (FIG. 3) and a second valve position 163B (FIG. 4) for selectively directing fluid from the intake conduit 104 to the first and second chamber portions 133L, 133R, respectively. In the first valve position 163A, the control member 162 provides fluid communication between the intake port 146 and the first flow port 150. In the second valve position 163B, the control member 162 provides fluid communication between the intake port 146 and the second flow port 152.

The valve 142 thus defines first and second chamber filling flow paths 165L and 165R when in the first and second valve positions 163A and 163B, respectively. The first chamber filling flow path 165L extends from the intake conduit 104, through the valve control member 162 to the first flow conduit 156, and into the first chamber portion 133L in the cylinder 112 wherein the first filling flow path 165L terminates. The second chamber filling flow path 165R extends from the intake conduit 104, through the control member 162 to the second flow conduit 158, and into the second chamber portion 133R wherein the second chamber filling flow path 165R terminates. The first and second chamber filling flow paths terminate in the respective first and second chamber portions in the sense that during a calibration cycle, fluid entering a respective chamber portion along a respective chamber filling flow path is captured and retained within the respective chamber portion, and has nowhere else to go (e.g. in the example illustrated, the respective chamber portion receiving fluid is in fluid communication only with the intake conduit 104, and is in fluid isolation from the discharge conduit 106). Thus the fluid entering a respective chamber portion cannot exit that chamber portion unless and until an evacuation flow path (that was closed during filling of the respective chamber portion) is opened.

In the example illustrated, the first and second valve positions 163A, 163B further define first and second evacuation flow paths 167, 169 for evacuating fluid from the chamber portions 133L, 133R to the discharge conduit 106. When in the first valve position 163A, the control member 162 provides fluid communication between the outlet port 160 and the second flow port 152. This provides the first evacuation flow path 167, extending from the second chamber portion 133R, to the second flow port 152 via the second flow conduit 158, and then to the discharge conduit 106. When in the second valve position 163B, the control member 162 provides fluid communication between the outlet port 160 and the first flow port 150. This provides the second evacuation flow path 169, extending from the first chamber portion 133L, to the first flow port 150 via the first flow conduit 156, and then to the discharge conduit 106.

Thus by toggling the valve 142 between the first and second valve positions 163A, 163B, flow from the intake conduit 104 can be alternately directed to the first and second sides 124L, 124R of the piston 118 in the cylinder 112 via the respective first and second filling flow paths 165L, 165R. The respective side 124L, 124R of the piston 118 facing the cylinder port 136L, 136R in fluid communication with the intake conduit 104 defines a filling side of the piston 118. The pressure of the fluid on the respective filling side of the piston 118 urges the piston 118 towards the opposing end of the cylinder 112, and forces the fluid behind the piston 118 (i.e. opposite the filling side) out along the respective first and second evacuation flow paths 167, 169. Once the piston 118 reaches the respective stop position 128L, 128R, further fluid flow into the fill side of the cylinder 112 is blocked. The calibration cylinder 112 thus admits a known, precise volume into the cylinder 112 (i.e. a volume defined by the single pass calibration volume), each time the valve 142 is moved from one to the other of the first and second valve positions 163A, 163B, which can be compared to an amount indicated by a flow meter measuring the volume of fluid supplied to the intake conduit 104.

Figure 5:
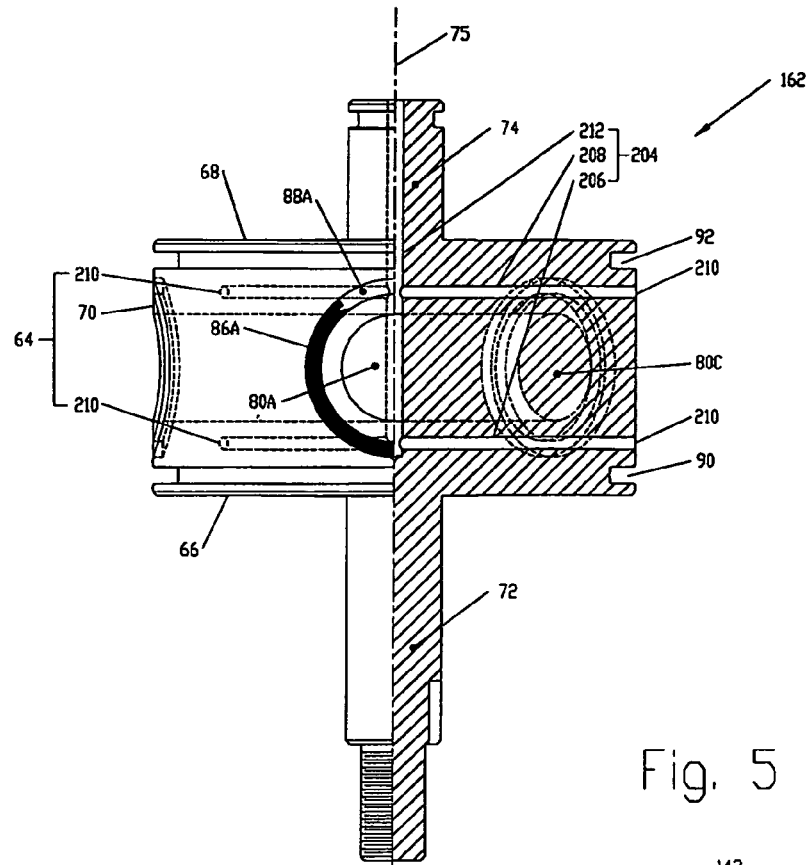
FIG. 5 is an enlarged side view in partial cross-section of a valve control member of the apparatus of FIG. 1.

Further details of the valve control member 162 and valve 142 will now be described, with reference also to FIGS. 5 and 6. The valve control member 162 is, in the example illustrated, a precision component machined from solid stainless steel stock. It has a central body 64 that is generally cylindrical in shape, having opposing front and rear faces 66, 68 between which a generally cylindrical outer surface 70 extends. Opposing front and rear shaft segments 72, 74 extend from the front and rear faces 66, 68, respectively, the shaft segments 72, 74 being coaxial with each other and the central body 64 along a valve axis 75 about which the control member 162 can rotate to move the valve 142 between the first and second valve positions 163A, 163B.

The valve flow control member 162 includes four channel openings 80A, 80B, 80C, and 80D (generically referred to as channel openings 80) provided in the outer surface 70 of the central body 64. The channel openings 80 are spaced circumferentially apart at 90° spacing, and are adapted for registration with respective ones of the ports 146, 150, 152, and 160. Adjacent pairs of the openings 80 are connected by respective bores extending inwardly therefrom to form first and second valve channels 82, 84 (see FIG. 3). In the example illustrated, the first channel 82 extends between channel openings 80A and 80B, and the second channel 84 extends between the channel openings 80C and 80D. The two channels 82 and 84 are in fluid isolation from each other within the control member 162.

The control member 162 is further, in the example illustrated, provided with four channel seals 86A, 86B, 86C, and 86D (generically referred to as channel seals 86). Each channel seal 86 is, in the example illustrated, in the form of an O-ring that is mounted in a respective seal seat 88 provided in the outer surface 70 of the control member 162, about each channel opening 80. The seal seats 88 can be annular in shape with a concave profile to match the curvature of the outer surface 70, and can be machined using an EDM (Electro-Discharge-Machine) process.

The valve control member 162 is, in the example illustrated, further provided with a front and a rear seal groove 90, 92 each extending around the circumference of the outer surface 70 of the central body 64. the front and rear seal grooves 90, 92 are positioned on axially opposite sides of the channel seals 86. Each seal groove 90, 92 is provided with a ring seal 94 retained therein.

The valve housing 144 defines therein a central pocket 172 for receiving the central body 64 of the control member 162. The pocket 172 that can be in the form of a precision machined cylindrical bore coaxial with the valve axis 75. The pocket 172 provides a cylindrical inner sidewall 176 that is adapted to be engaged by the channel seals 86 and the ring seals 94 in the assembled valve 142, to provide leakproof operation thereof.

Figure 7:
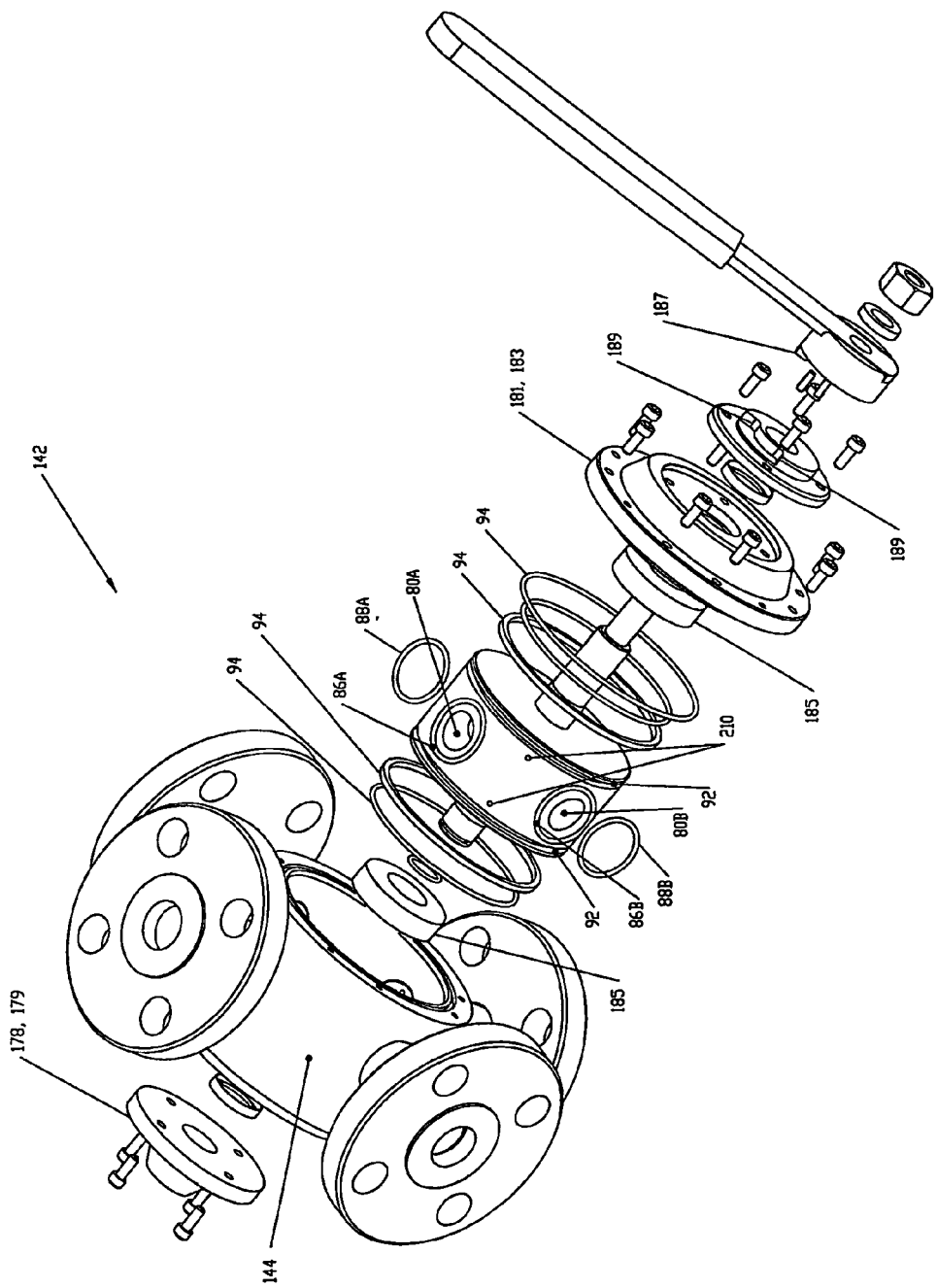
FIG. 7 is an exploded perspective view of the valve member of the apparatus of FIG. 1.

Referring also to FIG. 7, the valve housing 144 further includes a rear wall 178 and a rear cover plate 179, and a front wall 181 and a front cover plate 183 for enclosing front and rear axially opposing faces of the housing 144. The front and rear walls 181, 178 present bushing seats for retaining respective front and rear bushings 185. The front and rear bushings 185 engage the front and rear shaft segments 72, 74 of the control member 162 to rotatably support the control member 162 within the housing 144. The exterior surface of the front cover plate 183 can be provided with a pair of upstanding bosses spaced 90 degrees apart to be engaged by a tab member 187 extending from the valve handle. The bosses can be oriented relative to the control member 162 so that engagement of the respective bosses by the tab member 187 corresponds to the respective first and second valve positions 163A, 163B.

As seen in FIG. 6, the valve housing 144 in the example illustrated is further provided with four drilled and counterbored port holes 180A, 180B, 180C, and 180D (generically referred to as port holes 180) corresponding to the intake port 146, first and second flow ports 150, 152, and the outlet port 160, respectively. In the example illustrated, the port holes 180 extend through the housing 144 to provide inner port apertures in the inner sidewall 176 of the pocket 172. The port holes 180 can be cylindrical, extending along respective port axes 182 (i.e. port axes 182A, 182B, 182C, 182D, respectively) that are coplanar, normal to the valve axis 75, and disposed at 90° intervals about the circumference of the pocket 172.

To facilitate connection of the valve 142 to respective members of the fluid circuit 102, valve nipples 184A, 184B, 184C, and 184D (generically referred to as valve nipples 184) can be coupled to each respective port hole 182A, 182B, 182C, 182D. Each valve nipple 184 can be in the form of a hollow heavy wall cylindrical tube, having an inner end 186 for insertion into the respective port hole 180 and an outer end 188 opposite the inner end 186.

The inner end 186 of each nipple 184 can be provided with a support element 190 (also referred to herein as bridge member 190). The bridge member 190 can be in the form of a block of material that is provided adjacent the inner end 186 of the nipple 184, and that has a pattern of apertures 192 therein for providing fluid flow therethrough. In the example illustrated, the bridge member 190 is integral with the nipple 184, the nipple 184 being machined from a piece of solid stock material, bored part way through from the outer end 188 to provide the hollow tubular outer portion 193, and from the inner end 186 to provide the apertures 192 in fluid communication with the hollow outer portion 193. The apertures 192 can be sized to condition the flow of fluid through the respective port hole 180 so that the any turbulence is minimized or eliminated, thus reducing the chance of formation of any vapour bubbles which could adversely affect the accuracy of the apparatus 100. In other embodiments, the support element 190 can be in the form of a plug that is press-fit and/or fixed in place adjacent the inner end 186 of the nipple 184 by, for example, welding.

Further, in the illustrated example, each nipple 184 provides a perforated endface 194 generally comprising the material of the bridge member 190 disposed at the innermost end of the nipple 184 and generally normal to the respective port axis 182. The endface 194 of each nipple 184 is, in the example illustrated, contoured with a convex shape to match the shape of the inner sidewall 176 of the pocket 172. Thus the endface 194 can serve as a support surface for the channel seals 86, providing a surface against which the channel seals 86 can bear when the control member 162 is rotated between the first and second valve positions. During such rotation, the channel seals 86 remain substantially supported by the endface 194 as the seal passes across the inner end of the respective port hole. Without the support of the endface 194, the channel seals 86 could be subject to deformation and/or radially outward displacement of, for example, a circumferential leading portion (relative to the direction of rotation of the control member 162) of the channel seal 86 into the port hole upon passing a circumferential leading edge of a port hole. Such deformation could result in cutting or otherwise damaging the seal, particularly upon further rotation of the control member 162 whereupon the leading edge, for example, of the seal is forced back into position (i.e. radially inwardly) upon engagement with the trailing edge of the port hole. The endface 194 of each support element 190 can thereby improve the reliability and durability of the valve 142.

Leakage of the channel seals 86 could compromise the accuracy of the apparatus 100. To facilitate detecting leaks, the valve 142 is, in the example illustrated, provided with a leak detection structure comprising a valve containment reservoir 202 (FIGS. 3, 4, and 6) for containing any fluid that may work its way past the channel seals 86 (i.e. inside the valve housing 144, outside the outer diameter of the channel seals 86) when the valve 142 is in one of the first and second valve positions 263A, 263B. The valve containment reservoir 202 generally comprises an annular space extending (radially) between the outer surface 70 of the central body 64 of the control member 162 and the inner surface 176 of the pocket 172, and axially between the front and rear ring seals 94. The valve 142 is, in the example illustrated, further provided with a leak drain 204 (FIG. 5) in fluid communication with the containment reservoir 202 and extending out of the valve housing 144. The leak drain 204 can be periodically opened to check for streaming of fluid from the containment reservoir 202 which could indicate one or more faulty channel seals 86.

In the example illustrated, the leak drain 204 includes front and rear collection ducts 206, 208 in the form of transverse bores extending through the central body 64 of the control member 162. The collection ducts 206, 208 present respective duct openings 210 in the outer surface 70 of the central body 64, between the grooves 92 for the ring seals 94, so that the collection ducts 206, 208 are in fluid communication with the containment reservoir 202.

The leak drain 204 further includes a discharge duct 212 that extends generally axially through the control member 162, and intersects the front and rear collection ducts 206, 208. The rear cover plate 179 of the valve housing 144 is provided with a vent aperture fitted with a bleed valve 214 (FIG. 6), so that loosening of the bleed valve 214 allows fluid to flow from the containment reservoir 202 out the bleed valve 214, via the collection and discharge ducts 206, 208, 212. Any leakage of the seals 86 is indicated by calibration medium fluid flowing continuously from the bleed valve 214.

When moving the valve 142 out of one of the first and second valve positions 163A, 163B, it is desirable that the valve 142 provide a zero-flow condition until fluid communication has been established between the intake port 146 and the respective flow port 150, 152 associated with the other of the first and second valve positions 263A, 263B. In other words, it is desired that, when moving the valve 142 out of one of the first and second valve positions 263A, 263B, no fluid be dispensed by the metered supply into the inlet port 146 of the valve 142 until that fluid can be directed towards the filling side of the piston 118 for causing a corresponding displacement thereof. In the example illustrated, the valve 142 includes a third valve position to facilitate providing such zero-flow condition.

The third valve position is defined by an orientation of the control member 162 generally midway between the first and second positions corresponding to the first and second valve positions 263A, 263B. When in the third valve position, each of the channel seals 86 sealingly engages the inner surface 176 of the pocket 172 at a position between respective pairs of the ports 146, 150, 152, and 160, so that the ports are effectively rendered blind. No fluid can flow in or out of the ports, thus providing the zero-flow condition.

The apparatus 100 can be provided with structure to facilitate smooth deceleration and acceleration of the piston 118 when moving into and out of either of the piston stop positions 128L, 128R. In the example illustrated, the apparatus 100 is provided with dampener fluid passages 222 to provide such smooth deceleration and acceleration of the piston 118. This smoothing or dampening of the motion of the piston 118 can help to avoid abrupt stops, thus reducing risk of the piston 118 bouncing back from the respective first or second stop position 128L, 128R, which could adversely affect the accuracy of the apparatus 100. The dampener fluid passages 222 can provide a controlled evacuation of the fluid from between the piston 118 and the respective end cap 116L, 116R as the piston face 124L, 124R draws near the face 134L, 134R of the end cap 116L, 116R.

Furthermore, the dampener fluid passages 222 can reduce negative pressure (i.e. vacuum) when the piston 118 first moves away from the respective stop position 128. The expanding volume of the filling chamber portion 133 can create a vacuum effect, urging the piston 118 to stay in the respective piston stop position 128, and creating the risk of vapour bubbles in the fluid due to cavitation effects. The dampener fluid passages 222 can facilitate providing a sufficient source of fluid to fill the expanding volume of the filling chamber portion 133, which can facilitate operation of the apparatus 100 with relatively low flow, low pressure supply fluid, and can help to reduce risk of formation of vapour bubbles in the fluid.

Figure 9:
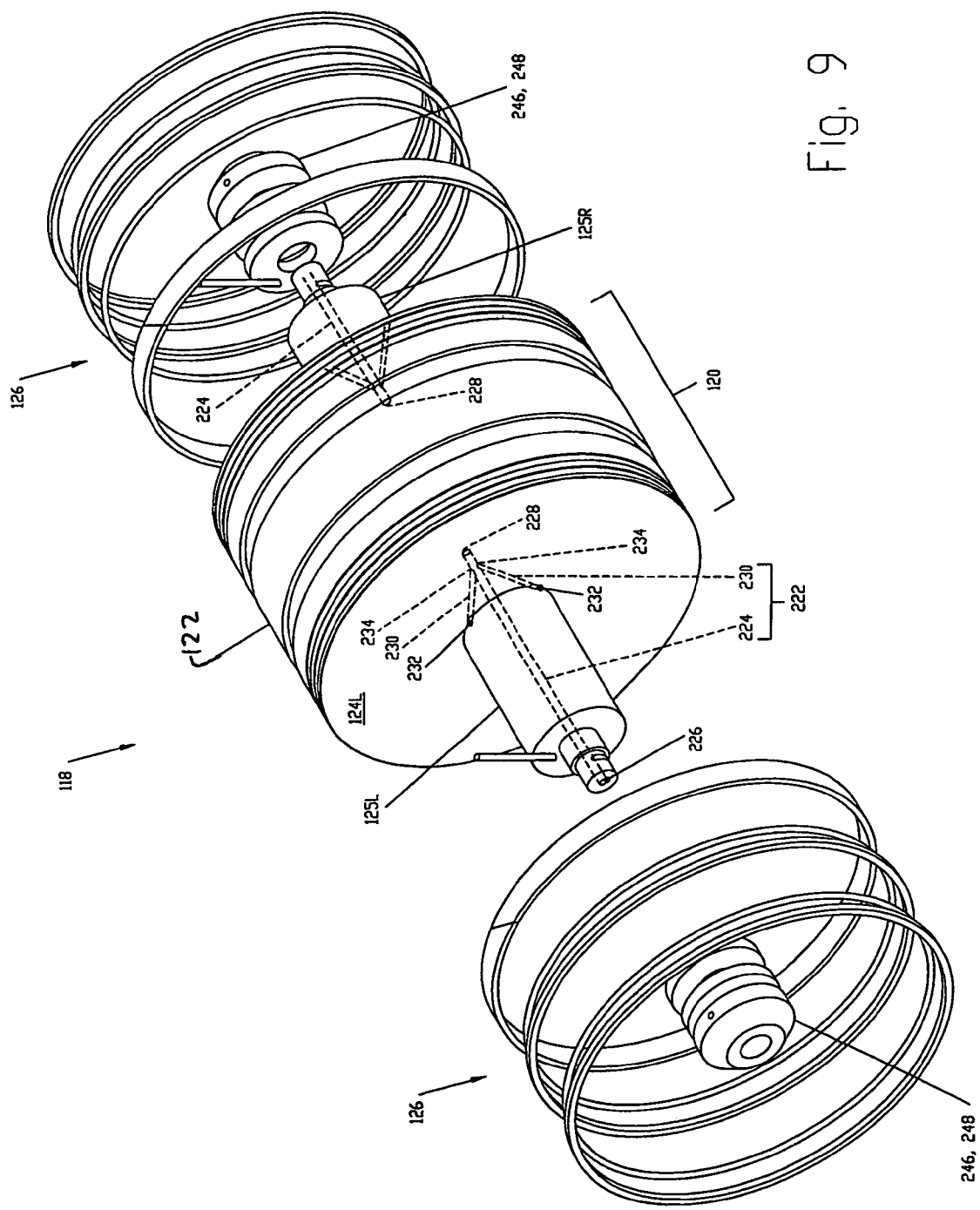
FIG. 9 is an exploded perspective view of a piston member of the apparatus of FIG. 1.

As seen in FIG. 9, in the example illustrated, the dampener fluid passages 222 include an axial passage 224 extending from a first end 226 that opens to the end face of the stub shaft 125 to a second end 228 that is blind and is positioned in the body portion of the piston 118. The dampener fluid passages 222 further include, in the example illustrated, a plurality of radial passages 230 that each extend between a first end 232 that is open to the face 124 of the piston 118, and a second end 232 that is open to the axial passage 224. In the example illustrated, the first ends 232 of the radial passages 230 are positioned proximate the intersection of the stub shaft 125 with the piston face 124, and the radial passages 230 are inclined at about 45 degrees relative to the piston face 124 and to the axial passage 224.

In operation, as the piston 118 advances to a respective end cap 116, the stub shaft 125 enters the recess 129 in the end cap 116, causing fluid pressure to increase in the recess 129 (enhanced by the close diametrical fit of the stub shaft 125 within the recess 129). This increase in fluid pressure slows down the piston 118. The fluid in the recess 129 is directed through the axial passage 224, and out the radial passages 230, i.e. between the advancing piston face 124 and the inner face 134 of the end cap 116, after which the fluid is forced out through the cylinder port 136.

Upon switching the position of the valve 142, fluid is directed through the cylinder port 136 and against the face 124 of the piston 118, urging the piston 118 away from the face 134 of the end cap 116. The dampener fluid passages 222 provide fluid communication between the recess 129 and the space between the end cap 116 and the piston face 124 (at various points about the diameter of the piston face 124), which in turn can facilitate smooth, cavitation-free acceleration of the piston 118 away from the end cap 116.

Since the piston 118 is completely enclosed with the cylinder 112, it can be advantageous to have a means for determining at which of the first and second ends of the cylinder 112 the piston 118 is positioned, and for confirming that the piston 118 is in fact precisely seated in one of the first and second piston stop positions 128L, 128R.

Figure 8:
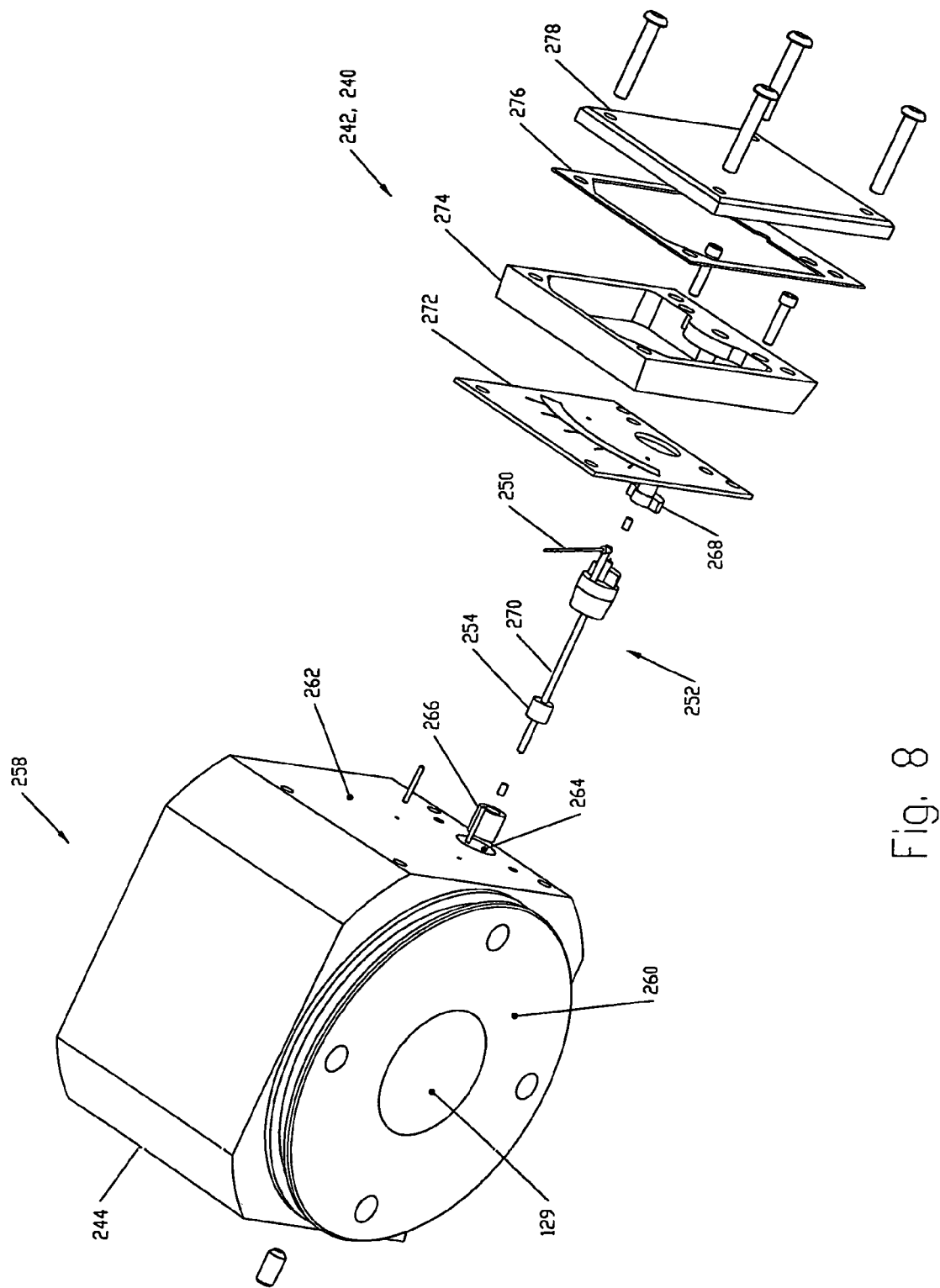
FIG. 8 is an exploded perspective view of a piston position indicating mechanism of the apparatus of FIG. 1.

Accordingly, the apparatus 100 is, in the example illustrated, provided with first and second stroke position indicator mechanisms 240L, 240R to provide visual confirmation that the piston 118 is seated precisely in the first or second piston stop positions 128. As seen in FIG. 8, the first and second stroke position indicator mechanisms 240 each include a respective indicator assembly 242 mounted to cap extensions 244 fixed to the first and second end caps 116, respectively, and a respective triggering element 246 fixed to the first and second stub shafts 125 of the piston 118, for triggering a response by the indicator assembly 242.

In the example illustrated, the first and second triggering elements 246 comprise piston magnets 248 (FIG. 9) fixed to the piston 118 for translation therewith. The piston magnets 248 can be in the form of ceramic ring magnets mounted to the respective stub shafts 125 and secured in place by a nut and pin assembly.

Each of the indicator assemblies 242 includes, in the example illustrated, an indicator needle 250 secured to a needle rotor assembly 252 that defines a needle pivot axis about which the needle 250 can pivot. The needle rotor assembly 252 includes rotor magnets 254 fixed thereto for interacting with the magnetic field generated by the piston magnets 248 of the triggering elements 246.

The indicator assembly 242 can be mounted to the cap extension 244 to provide proximate positioning of the rotor magnets to the piston magnets when the piston is in one of the piston stop positions. More particularly, in the example illustrated, each cap extension 244 has an axially inner face 258 for bearing against the end cap, and an axially outer face 260 opposite the inner face. The recess 129 for receiving the stub shaft 125 extends into the axially inner face 258, and at least partially through the cap extension 244 towards the axially outer face 260.

The cap extension 244 has a front face 262 that extends between the axially inner and outer faces 258, 260 and to which the indicator assembly 242 can be mounted. A rotor assembly bore 264 is provided in the front face 262, extending towards the recess 129 and directed generally normal thereto. The rotor assembly bore 264 can be adapted to receive upper and lower bearings 266, 268 for supporting a shaft portion 270 of the rotor assembly 252. An indicator scale 272 can be mounted flush against the front face 262, behind the needle 250. A spacer 274, gasket 276, and viewing lens 278 can be mounted over the scale 272 and needle 250 to complete the installation of the indicator assembly 242.

In operation, the piston magnets 248 fixed to the stub shafts 125 of the piston 118 generate a magnetic field that interacts with the magnetic field of the rotor magnets 254 of the needle rotor assembly 252. The relative position of the piston magnets 248 (fixed to the piston 118) with respect to the rotor magnets 254 changes the strength of the interaction of the magnetic fields, causing a corresponding change in the position of the indicator needle 250. The position of the indicator needle 250 can be noted (e.g. against the scale 272) when the piston 118 is in the precise respective stop position 128. This noted needle position can be used as a comparison for future cycles of the piston 118 to confirm that the piston 118 has reached, and remained precisely in, the respective piston stop position 128. The stroke position indicating mechanism, in the example illustrated, operates on magnetic/mechanical principles, is free of costly and complex electronic/digital components, and requires no external and/or electrical power supply for operation.

The apparatus 100 can further be provided with a flow direction indicating mechanism 280 to provide visual confirmation of the direction of travel of the piston 118 when moving between the first and second stop positions 128. In the example illustrated, the apparatus 100 is provided with a first and a second flow direction indicating mechanism 280L, 280R mounted in the first and second flow conduits 156, 158, respectively.

Figure 10:
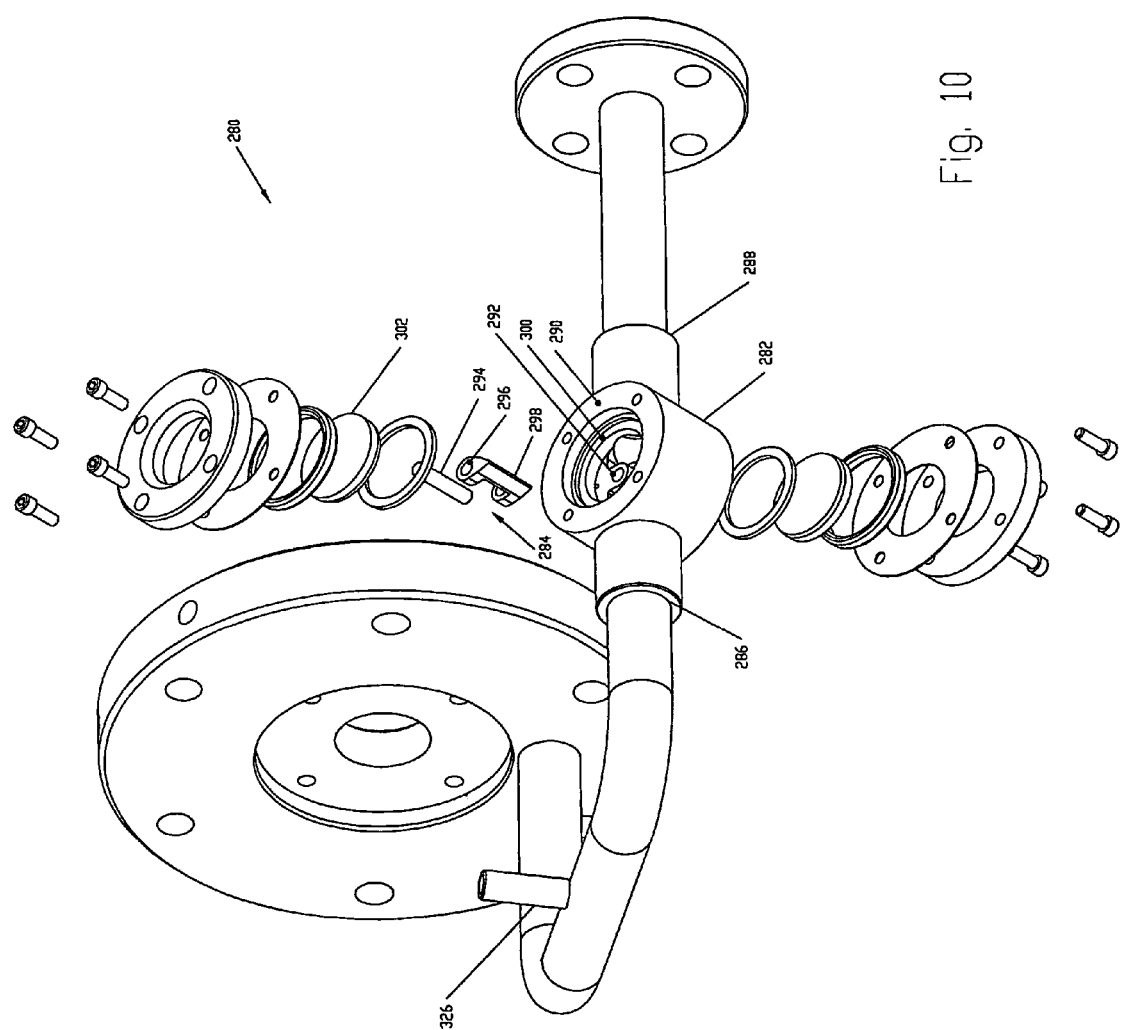
FIG. 10 is an exploded perspective view of a flow direction indicating mechanism of the apparatus of FIG. 1.

As seen in FIG. 10, each flow direction indicating mechanism 280 includes, in the example illustrated, a sealed hollow casing 282 in which a flow direction pointer 284 is pivotably mounted. The casing 282 has flow apertures 286, 288 spaced 180 degrees apart for in-line connection with the respective conduit 156, 158. The casing 282 presents an internal bore 290 with a drilled pivot boss 292 extending radially inwardly from a sidewall of the bore 290. The flow direction pointer 284 can be mounted to the boss 292 by means of a pivot pin 294, such that the pivot pin 294 is generally centered between the flow apertures 286, 288. The flow direction pointer 284 is, in the example illustrated, made of plastic material and is generally tear-drop shaped in cross section, having a bulbous base end 296 through which the pivot pin 294 is inserted, and a pointed tail 298 extending from the base end 296. The internal bore 290 has an annular shoulder 300 against which a glass lens 302 and associated sealing gaskets and retaining rings can bear.

In operation, fluid flowing between the flow apertures 286, 288 bears against the direction pointer 284, causing the pointer 284 to pivot, with the pointed tail 298 aligning with the direction of flow. Thus the pointer indicates the direction of fluid flow in the respective conduit, and since the piston travels with the flow of the fluid, the direction of travel of the piston in the cylinder is also revealed. The shape of the pointer 284 promotes laminar flow of the fluid around the pointer 284, which can reduce the risk of forming vapour bubbles in the fluid.

Figure 11:
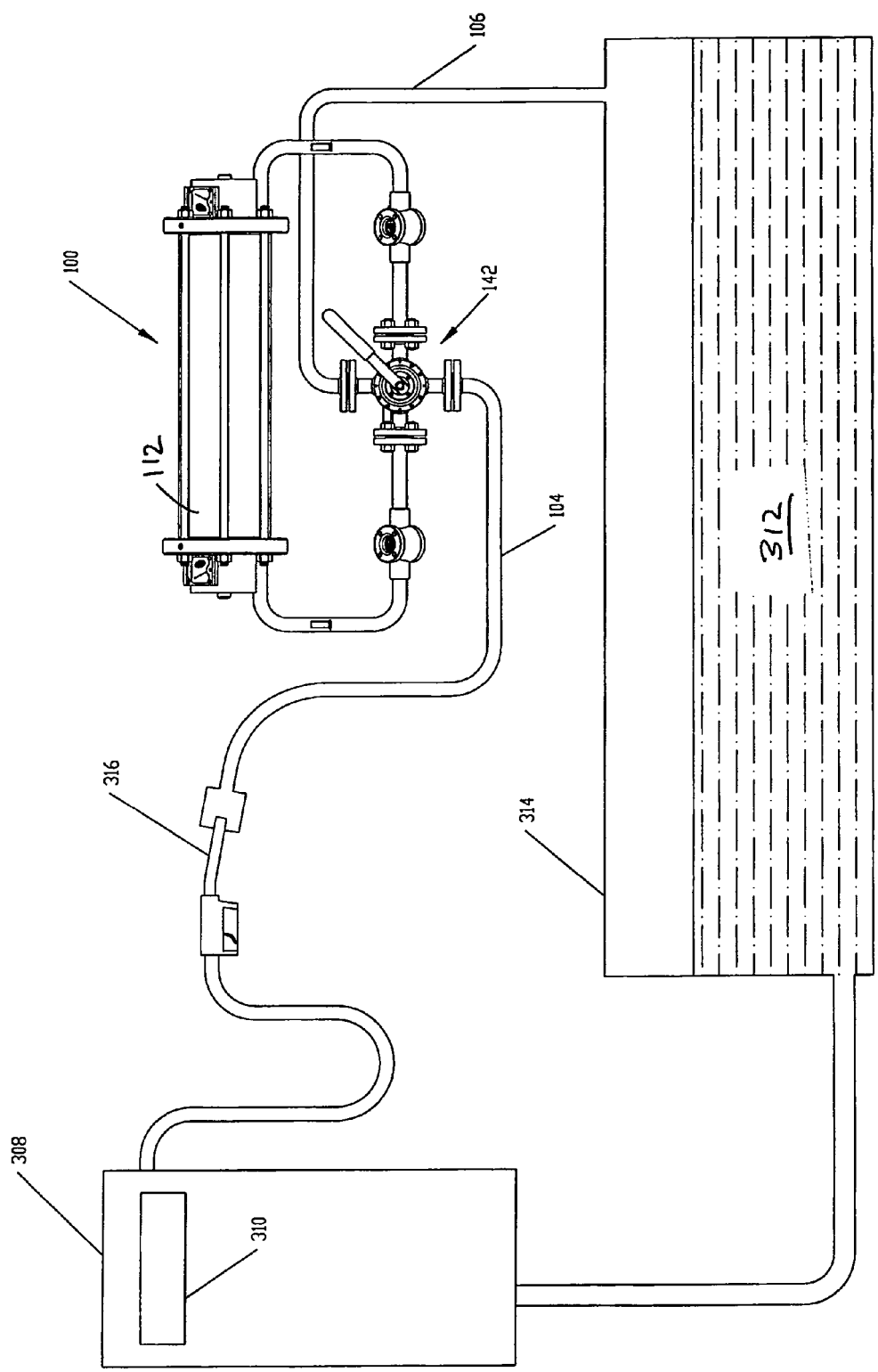
FIG. 11 is a schematic view of the apparatus of FIG. 1 shown in combination with a fuel pump for calibrating a meter thereof.

An example of use of the apparatus 100 will now be described in greater detail with reference to FIG. 11. In FIG. 11, the apparatus 100 is shown in connection with a gasoline pump 308 having a meter 310 for measuring the volume of liquid gasoline 312 dispensed therefrom. The pump 308 draws the liquid gasoline 312 from an underground storage tank 314, and dispenses it via a nozzle 316.

To use the calibration apparatus 100, the nozzle 316 is coupled to the intake conduit 104, and the discharge conduit 106 can be conveniently connected to discharge the gasoline 312 back to the tank 314. The nozzle 316 is coupled to the intake conduit 104 to provide a sealed (air and liquid tight) connection therebetween.

Before proceeding with an actual calibration cycle, the apparatus 100 can be primed to fill the fluid circuit 102 with the calibration fluid (e.g. the gasoline 312) and remove any air or vapour bubbles therefrom. In this discussion, the piston 118 is in the first piston stop position 128L upon initial connection to the gas pump 308. The valve 142 can be moved to the first valve position 163A, directing fluid (gasoline) 312 into the first chamber portion 133L. The pressure of the gasoline 312 urges the piston 118 towards the second piston position 128R. Once in the second piston position 128R, the first chamber portion 133L is generally filled and further fluid flow into the intake conduit 104 is completely blocked.

The valve 142 can then be moved to the second valve position 163B, so that the second flow conduit 158 and second chamber portion 133R are filled with fluid 312. As the piston 118 moves from the second piston stop position 128R to the first piston stop position 128L, the fluid 312 previously supplied to the first chamber portion 133L is discharged therefrom via the second evacuation flow path 169, and conveniently directed back to the storage tank 314.

When the piston 118 reaches the first piston stop position 128L, the second chamber portion 133R is full of fluid 312 to its capacity, and further fluid flow into the intake conduit 104 again comes to a complete stop.

Any vapour bubbles in the fluid circuit 102 can be bled by opening respective bleed valves. For example, the apparatus 100 is, in the example illustrated, provided with first and second end cap bleed valves 322L, 322R provided in the first and second end caps 116L, 116R, and first and second casing bleed valves 324L, 324R provided in the casings 282 of the first and second flow direction indicating mechanisms 280. With the valve 142 in the first valve position 163A, the first bleed valves 322L, 324L can be opened to discharge liquid and any vapour therethrough. Once the fluid 312 is free of any vapour, the bleed valves 322L, 324L can be closed. This process can be repeated for the second bleed valves 322R, 324R with the valve 142 in the second valve position 163B.

To begin a first calibration cycle, the piston 118 can again be considered to be initially in the first piston stop position 128L. This can be confirmed by checking the position of the needle 250 of the first stroke position indicator 240L. The valve 142 can initially be in the second valve position 163B (i.e. having urged the piston 118 to the first piston position 128L).

The reading on the meter 310 of the gas pump 308 can be noted or zeroed. The valve 142 can be moved to the first valve position 128L, at which point fluid flow from the nozzle 316 is admitted through the intake conduit 104 and directed towards the first chamber portion 133L. Fluid continues to flow into the intake conduit 104 until the piston 118 reaches the second piston stop position 128R, at which point fluid flow comes to a complete stop. The reading of the meter 318 can then be noted and compared to the known calibration volume admitted into the intake conduit 104.

The valve 142 can be toggled to the second valve position 163B, at which a second volume of fluid is admitted through the intake conduit 104, again corresponding in amount to the calibration volume. The steps of switching the position of the valve 142 to admit additional batches of fluid 312 precisely corresponding in volume to the calibration volume can be repeated, and the aggregate amount can be compared to the reading of the meter 310. The various calibration passes can be performed multiple times and at different flow rates from the nozzle, as may be required by industry standards.

The apparatus 100 can include a thermowell 326 (FIG. 10) for receiving a temperature sensor to indicate the temperature of the fluid 312 during the calibration procedure. The temperature can be recorded and used in calculations to compensate for changes in volume as a result of temperature changes.

The apparatus 100 thus provides a calibration device that is compact in size, and can be mounted to a wide variety of smaller utility transport vehicles such as, a pick-up truck, light highway trailers, shop hand carts, or any other mode of transportation. The compact size and lightweight nature of the apparatus can also facilitate mounting as a stationary device on a shop bench.

The apparatus 100 is, in the example illustrated, free of any powered electrical, digital or electro/mechanical sensing devices or pulse generating devices. All sensing indicators can be of mechanical and/or magnetic type that require no source of power for operation. Thus electrical utilities either from the transport vehicle or the field location are not required to operate this device. The apparatus 100 can also, as a result, be particularly well-suited for use in hazardous locations, or in remote locations.

The apparatus 100 is a closed loop system device, meaning that all fluid containing and/or conducting passages in the apparatus, between the intake conduit and the discharge conduit, are sealed off form the ambient environment during calibration cycles. Thus there is no release of vapors to affect calibration volumes. This sealed (or "closed-loop") configuration can improve accuracy of the calibration since vapour losses are generally eliminated. The reduction or elimination in vapourization also lessens any negative impact on the environment, and can improve operator safety.

Repeated calibration cycles (or passes can very easily be performed by simply toggling the valve. This can greatly reduce the amount of time required to perform a complete calibration sequence, and can reduce the amount of manual handling of containers of fluid 312 (with risk of spillage).

While the above description provides examples of one or more processes or apparatuses, it will be appreciated that other processes or apparatuses may be within the scope of the accompanying claims.

The invention claimed is:

1. A flow meter calibration apparatus, comprising:
    a) a calibration cylinder defining a chamber, the cylinder including first and second end caps at axially opposing ends thereof, a first cylinder port adjacent the first end cap and a second cylinder port adjacent the second end cap;
    b) a piston movable within the cylinder between a first stop position adjacent the first end cap and a second stop position adjacent the second end cap, the piston defining a first and a second chamber portion on opposite sides of the piston, the first and second chamber portions being in fluid communication with the first and second cylinder ports, respectively, regardless of the position of the piston;
    c) a valve movable between first and second valve positions for alternately directing fluid flow from a supply line to one and separately to the other of the first and second cylinder ports; and
    d) wherein the volume swept by the piston when moving from one to the other of the first and second stop positions defines a calibration volume, and upon admitting an amount of fluid through a respective cylinder port equal to the calibration volume, further fluid flow into the respective cylinder port is stopped.

2. The apparatus of claim 1, further comprising a piston position indicating mechanism for providing visual indication that the piston is precisely positioned in a respective one of the first and second stop positions.

3. The apparatus of claim 2 wherein the piston position indicating mechanism includes a triggering element fixed to the piston and a sensing element responsive to the triggering element and fixed relative to the cylinder.

4. The apparatus of claim 3 wherein the triggering element comprises a piston magnet fixed to the piston, and the sensing element comprises a needle secured to a needle rotor assembly, the needle rotor assembly including a rotor magnet for responding to a magnetic field generated by the piston magnet.

5. The apparatus of claim 1 comprising a first conduit extending from the valve to the first cylinder port, and a second conduit extending from the valve to the second cylinder port.

6. The apparatus of claim 5 comprising a flow direction indicating mechanism mounted in at least one of the first and second conduits for providing visual confirmation of the direction of travel of the piston when moving between the first and second stop positions.

7. The apparatus of claim 6 wherein the flow direction indicating mechanism comprises a sealed hollow casing having opposed flow apertures for inline connection along a respective one of the first and second conduits, and a flow direction pointer pivotably mounted in the casing between the opposed flow apertures.

8. The apparatus of claim 1 wherein when in the first valve position, fluid received by the valve from the supply line is directed to the first cylinder port, for filling the first chamber portion.

9. The apparatus of claim 1 wherein when in the second valve position, fluid received by the valve from the supply line is directed to the second cylinder port, for filling the second chamber portion.

10. The apparatus of claim 1 wherein the valve includes an intake port in fluid communication with the supply line, a first flow port in fluid communication with the first cylinder port, a second flow port in fluid communication with the second cylinder port, and an outlet port in fluid communication with a discharge conduit, and wherein when the valve is in the first valve position, the intake port is in fluid communication with the first flow port to open a first chamber filling flow path extending between the supply line and the first chamber portion, and when the valve is in the second valve position, the intake port is in fluid communication with the second flow port to open a second chamber filling flow path extending between the supply line and the second chamber portion.

11. The apparatus of claim 10, wherein the first and second chamber filling flow paths are in fluid isolation from the discharge conduit.

12. The apparatus of claim 11, wherein the first valve position defines a first evacuation flow path extending from the second chamber portion to the discharge conduit.

13. The apparatus of claim 12, wherein the second valve position defines a second evacuation flow path extending from the first chamber portion to the discharge conduit.

14. The apparatus of claim 13, wherein the first evacuation flow path comprises the second flow port and the outlet port.

15. The apparatus of claim 13, wherein the second evacuation flow path comprises the first flow port and the outlet port.

16. The apparatus of claim 13, wherein the valve comprises a shut-off position between the first and second valve positions wherein the intake port is in fluid isolation from the first and second flow ports and the outlet port.

17. The apparatus of claim 11, wherein the valve comprises a housing defining an internal pocket and a flow control member rotatably retained in the pocket, the first and second flow ports extending from the housing on opposing sides of the pocket, the intake pod extending from the housing intermediate the first and second flow ports, and the outlet pod extending from the housing opposite the intake port.

18. The apparatus of claim 17 wherein the flow control member comprises a central body with two separate channels extending therethrough, each channel extending between first and second channel openings provided in an outer surface of the body and spaced apart at 90 degrees therearound, the control member including o-ring channel seals retained in the body about the channel openings for engaging an inner surface of the pocket.

19. The apparatus of claim 18, wherein the intake port, outlet port, and first and second flow ports include support elements at inner ends thereof, the support elements presenting a concave endface in alignment with the inner surface of the pocket for supporting the o-ring channel seals when the control member is rotated, and the support elements including flow apertures therethrough to provide fluid communication across the support elements, the flow apertures being sized to minimize turbulence of fluid flow passing through the flow apertures.

20. The apparatus of claim 19, wherein the valve comprises a leak detection structure for detecting leakage of the o-ring channel seals, the leak detection structure including a valve containment reservoir disposed between the inner surface of the pocket and the outer surface of the body of the control member, and a leak drain providing fluid communication between the containment reservoir and a bleed valve mounted to the exterior of the housing.

* * * * *